UNITED STATES PATENT OFFICE.

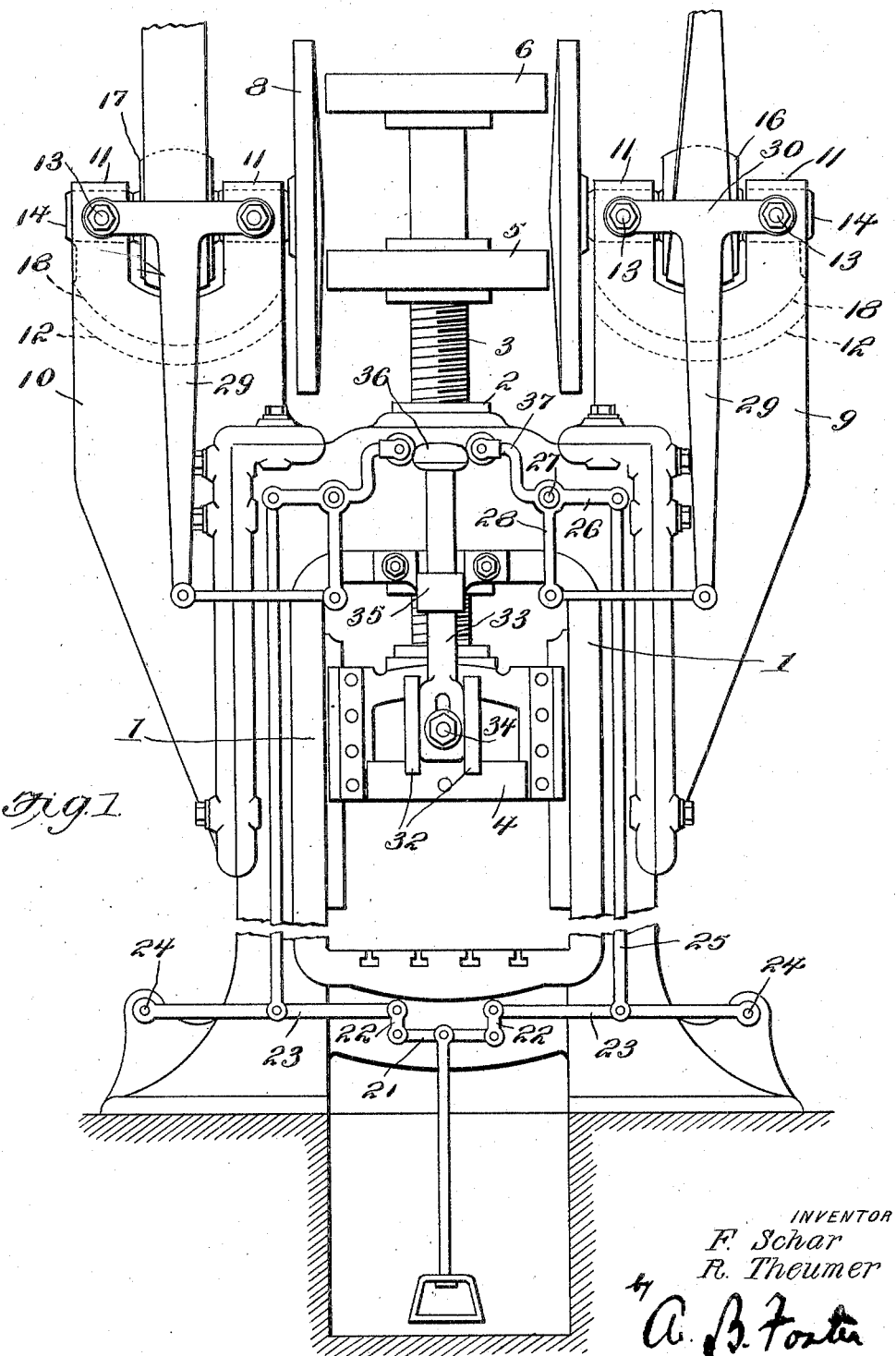

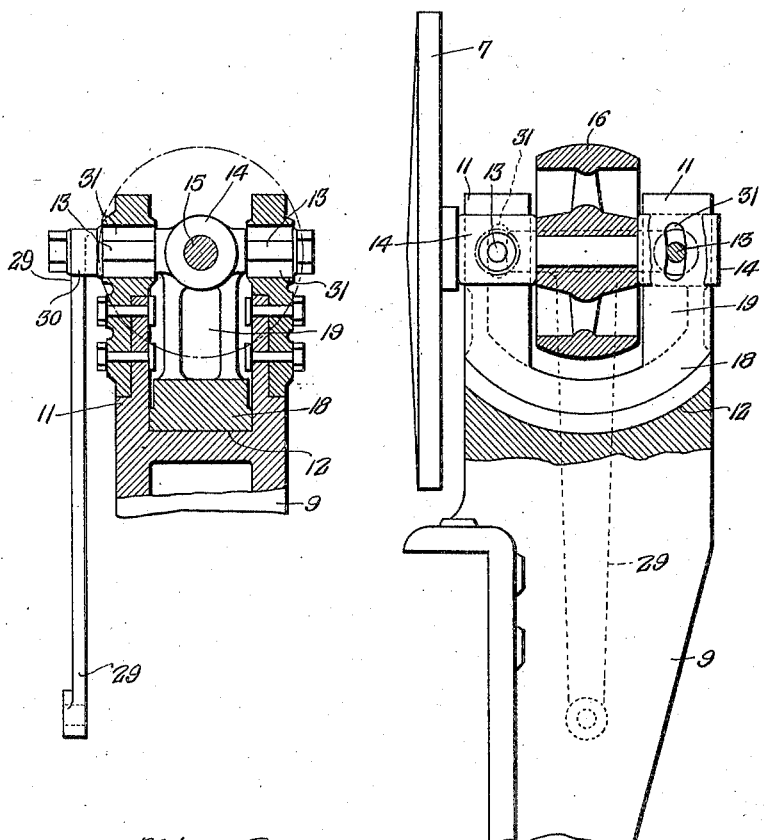

FERDINAND SCHAR, OF SCHWECHAT, NEAR VIENNA, AND RUDOLF THEUMER, OF VIENNA, AUSTRIA.

FRICTION-DRIVEN PRESS.

1,321,945.  Specification of Letters Patent.  Patented Nov. 18, 1919.

Application filed August 12, 1916. Serial No. 114,666.

*To all whom it may concern:*

Be it known that we, FERDINAND SCHAR, manufacturer, Schwechat, near Vienna, and RUDOLF THEUMER, engineer, Vienna, Austria, both subjects of the Emperor of Austria, residing at Schwechat, near Vienna, and Vienna, Austria, have invented certain new and useful Improvements in Friction-Driven Presses, of which the following is a specification.

This invention relates to a press driven by friction wheels and has for its object to relieve the spindle and to increase the power of the press. According to this invention, the driving pulley mounted on the spindle is driven by two friction wheels arranged opposite each other and rotating in opposite directions. Instead of a single pair of friction wheels, the wheels of which are arranged opposite each other, several pairs of friction wheels or disks could be used, more particularly in the case of large presses. Owing to the engagement with the driving pulley of the press taking place at two opposite points, and owing to the friction disks being pressed on from both sides, this arrangement has the advantage that lateral pressures on the spindle, or on the guide nut, and the consequent premature wearing out in the case of presses with one-sided drive, are avoided, and at the same time, power is economized owing to the suppression of lateral friction. Moreover, owing to the driving pulley being rotated in the same direction at both opposite points, the power of the press is considerably increased as compared with presses with one sided drive with the same thickness of spindle.

The invention could be carried out in various ways, and the accompanying drawing shows, by way of example, a construction of the press according to the invention.

Figure 1 shows the press in elevation, while

Figs. 2 and 3 show the mounting of one friction disk in an adjustable manner, partly in section, in front elevation and in side elevation.

In the standard 1, in a suitable guide nut 2, is guided the spindle 3 provided at the bottom end with a flange 4 traveling in guides, and at the upper end, with two driving pulleys 5 and 6. At both sides of the pulleys, opposite each other, are arranged friction disks 7, 8, the driving faces of which are slightly conical, so that by turning the friction disks 7, 8, first the lower half of the same can be brought into engagement with the lower driving pulley 5, and then the upper half of the friction disks can be brought into engagement with the driving pulley 6. In order to carry out the turning of the friction disks 7, 8, they are supported in a special manner. The brackets 9, 10 are provided at the upper end with four bearings 11 between which is provided a surface 12 curved in an arc of a circle. The bearings 11 are intended to guide the pins 13 fitted to the bush 14 of the bearings for the spindle 15 of the friction disk 7 or 8. Between the bearing bushes are arranged convex belt pulleys 16, 17, the pulley 17 being driven by an open, and the other pulley 16 by a crossed belt, in order to obtain rotation of the friction disks in the opposite directions. In order to avoid any change of the belt tension when turning the friction disks 7, 8, the curvature of the surface 12 has for its center the center of the belt pulley 16 or 17, a shoe 18 connected to the bearing bushes 14 by means of feet 19 sliding on the said curved surface like a cross-head.

Fig. 1 shows the driving pulleys 5, 6 and the flange 4 just before the highest position is reached, while the friction disks 7, 8, as well as the control gear, are shown in the central position. For the down stroke, the driving pulley 5 is driven by the lower halves of the friction disks 7 and 8, and the said lower halves must accordingly be brought toward each other so that the generatrices of the conical working surface of the friction disks in the central plane of the spindle, are parallel to the axis of the spindle. The driving pulley 5 is moved with with increasing speed downward, the friction disks 7, 8 being pressed against it. This turning of the lower halves of the friction disks 7, 8 and the simultaneous pressing against the driving pulley 5, are produced by means of the pedal 20 connected by an intermediate member 21 and rods 22 to lever arms 23 pivoted about pins 24 on the standard 1. Connecting rods 25 lead from the lever arms 23 to the arms 26 of the bell crank levers pivoted at 27 and engaging by means of their second arms 28 with arms 29 engaging with the bearing pins 13 by means of the cross-piece 30. When the pedal 20 is depressed, the arm 29 is turned with its lower end toward the center of the press by means of the bell-crank lever 26, 28, the pins 13 sliding in the curved guides 31 of the bearings 11, and the bearing head 18, 19 of the friction disks 7, 8 being turned about the center of the belt pulley.

When the flange 4 has reached it lowest position, the pedal 20 is released, whereby the upper halves of the friction disks 7, 8 automatically move toward the center owing to their excess of weight, or by means of a balance weight not shown in the drawing, and press against the upper driving pulley 6, whereby the latter is seized and carried again, with increased speed, upward by the inner portion of the friction disks 7, 8. For automatically reversing the motion when the highest position is reached, the flange 4 is provided between the guides 32 with a connecting rod 33 which can be suitably adjusted and locked in position by means of a screw 34. On the standard 1 is provided another guide sleeve 35, and the connecting rod 33 has at the upper end a head 36 which, when the highest position is reached, strikes the end of the arms 37 provided on the bell crank lever 26, 28, whereby the control gear is shifted, and the arms 29, as well as the lower halves of the friction disks 7, 8, are pulled toward the center of the spindle.

Not only the friction disks 7, 8, but also the driving pulleys 5, 6 can be made conical, and by raising and lowering the driving pulleys or the friction disks, first the lower driving pulley can be brought into engagement with the lower half, and then the upper driving pulley with the upper half of the friction disks. During their driving, the driving pulleys remain on the same level and turn the spindle on which the flange is moved up and down by means of a nut. The friction disks could be moreover provided with a flat driving face, and merely bring about the accelerated descent of the head. In this construction, only one driving pulley is required, which, for producing the upward movement, can be brought into engagement with a separate friction disk which is mounted between the two driving friction disks and can be separately pressed against the driving pulley for the purpose of bringing about the upward movement. The invention can be carried out in a number of ways, all based on the same main idea of relieving the spindle and increasing the power by driving the driving pulley on the spindle by means of two friction wheels arranged opposite each other and rotating in opposite directions.

We claim:—

1. In a press of the kind described, a screw spindle, a pair of spaced friction wheels mounted on said spindle, a pair of friction disks mounted on opposite sides of said friction wheels and having tiltable movement to cause contact of the disks with one of said wheels when tilted in one direction and with the other thereof when tilted in the opposite direction, means to tilt said disks and means to drive the disks in opposite directions.

2. In a press driven by friction wheels, the combination with two driving pulleys mounted on the spindle, of two friction wheels having conical faces and arranged opposite each other, means for driving said wheels in opposite directions, and means for tilting said wheels to bring the lower parts of the wheels into contact with the lower pulley or the upper parts into contact with the upper pulley.

3. In a press driven by friction wheels, the combination with two driving pulleys mounted on the spindle, of two opposed friction wheels, spindles for said wheels, a belt pulley on each of said spindles, and bearings therefor mounted in curved guides the centers of which coincide with the centers of the belt-pulleys, means for swinging said bearings about said centers, and means comprising open and crossed belts for driving said friction-wheels in opposite directions.

In testimony whereof we affix our signatures in the presence of two witnesses.

FERDINAND SCHAR.
RUDOLF THEUMER.

Witnesses:
AUGUST FUGGER,
ARTHUR HERZOG.